(12) United States Patent
Mirchi et al.

(10) Patent No.: US 7,186,357 B2
(45) Date of Patent: Mar. 6, 2007

(54) HIGH SWELLING RAMMING PASTE FOR ALUMINUM ELECTROLYSIS CELL

(75) Inventors: Amir A. Mirchi, Jonquière (CA); Weixia Chen, Chicoutimi (CA); Lise Lavigne, Chicoutimi (CA); Emmanuel Bergeron, Alma (CA); Jules Bergeron, Jonquière (CA)

(73) Assignee: Alcan International Limited, Montreal (CA)

( * ) Notice: Subject to any disclaimer, the term of this patent is extended or adjusted under 35 U.S.C. 154(b) by 369 days.

(21) Appl. No.: 10/387,020

(22) Filed: Mar. 12, 2003

(65) Prior Publication Data

US 2004/0178063 A1    Sep. 16, 2004

(51) Int. Cl.
- C25C 3/08     (2006.01)
- C04B 35/00    (2006.01)
- B28B 7/36     (2006.01)
- B05D 5/12     (2006.01)

(52) U.S. Cl. ............... 252/502; 106/38.25; 106/278; 106/284.05; 204/294; 264/105; 208/6; 427/122; 427/113

(58) Field of Classification Search ............... 252/502, 252/511, 500; 106/278, 38.25, 284.05; 204/294; 264/105; 208/6; 427/122, 113
See application file for complete search history.

(56) References Cited

U.S. PATENT DOCUMENTS

| | | | |
|---|---|---|---|
| 2,998,375 A * | 8/1961 | Warren et al. ............... 204/294 |
| 3,865,713 A * | 2/1975 | Kawai et al. ................... 208/6 |
| 3,871,986 A * | 3/1975 | Reamey et al. ............. 264/29.1 |
| 4,218,331 A * | 8/1980 | Bacha et al. ................. 508/333 |
| 4,282,039 A * | 8/1981 | Bullough ..................... 106/278 |
| 4,288,353 A * | 9/1981 | Eckel et al. ................. 523/450 |
| 4,369,171 A * | 1/1983 | Grindstaff et al. .......... 423/461 |
| 4,445,996 A | 5/1984 | Kawamata |
| 4,466,996 A * | 8/1984 | Boxall et al. ................ 427/122 |
| 4,613,375 A * | 9/1986 | Forster et al. ......... 106/284.05 |
| 4,624,766 A * | 11/1986 | Boxall et al. ................ 204/294 |
| 5,676,807 A | 10/1997 | de Nora et al. .......... 204/243 R |
| 5,961,811 A | 10/1999 | Keller ......................... 205/386 |
| 6,251,307 B1 * | 6/2001 | LeCours et al. ............. 252/503 |
| 6,258,224 B1 | 7/2001 | Mirtchi ..................... 204/247.3 |
| 6,406,615 B1 * | 6/2002 | Iwamoto et al. ............. 208/213 |

FOREIGN PATENT DOCUMENTS

WO     WO 00/29644     5/2000

* cited by examiner

Primary Examiner—Mark Kopec
Assistant Examiner—Kallambella Vijayakumar
(74) Attorney, Agent, or Firm—Cooper & Dunham LLP

(57) ABSTRACT

A new ramming paste for aluminum reduction cell cathodes is a high swelling cold ramming paste made of a blend of pitch, light oil diluent and an aggregate comprising a mixture of anthracite and crushed anode butts or calcined coke. The presence of the crushed anode butts or calcined coke increases the sodium swelling index of the paste by about four times higher than that of regular ramming pastes. This new high swelling cold ramming paste may also contain an amount of a refractory hard material, such as $TiB_2$.

3 Claims, 1 Drawing Sheet

1- New Swelling Cold Paste
2- Standard Cold Paste
3- Vesuvius CP45

HIGH SWELLING RAMMING PASTE FOR ALUMINUM ELECTROLYSIS CELL

FIELD OF THE INVENTION

This invention relates to an improved ramming paste for aluminum reduction cell cathodes.

BACKGROUND OF THE INVENTION

Aluminum metal is conveniently produced in an electrolytic cell by passing a current through a bath of molten cryolite containing dissolved alumina. The cell is typically a large tank or cell lined with carbon, with the lining serving as part of the cathode system. Large carbon blocks extend into the top of the bath to function as the anode. Molten aluminum metal collects as a metal pad at the bottom of the cell. The cell typically has a bottom lining made up of cemented carbon blocks in which horizontally disposed steel cathode bars extend from the opposite sides of the cell. These cathode bars are connected to the cathode collector blocks by means of cast iron, and the blocks are anchored in a side lining.

Most aluminum reduction cells in commercial use employ prefabricated carbon blocks as the cell lining and as the cathodic working surface. These blocks provide high operating strength, high density, and lower electrical resistivity than that of continuous rammed paste type of linings. The blocks are formed into a liquid-tight container surfaced by filling the joints between the blocks with a ramming paste. The efficiency of sealing of the ramming paste is an important factor in determining the life and energy efficiency of a reduction cell, which depends to a great degree on the extent and rate of electrolytic penetration into the cell bottom.

The anodes are typically made from crushed petroleum coke and liquid pitch, which is formed into rectangular blocks and baked. These anode blocks are attached to rods and suspended into the electrolytic cell where they are slowly consumed in the aluminum smelting process.

They must be replaced after several weeks and the remaining portions attached to the rods that are removed are known as "anode butts". These butts are typically recycled.

The cathode blocks are traditionally made from an anthracite aggregate mixed with a pitch binder. Graphite components can be substituted to increase electrical conductivity. As mentioned above, ramming paste is used to fill the spaces and form seams between individual cathode blocks, as well as to connect the side walls with the cathode blocks. A typical hot ramming paste consists of an anthracite filler and a coal tar binder. A cold (room temperature) paste binder usually includes a diluent to lower its softening point.

For making the joints with ramming paste, the paste is added to the joint spaces and compacted, e.g. with pneumatic hammers. The joints are formed in several layers to a final top surface flush with the top of the cathode blocks. Side walls, including monolithic slopes, can be formed in a similar manner by compacting the paste.

Premature cell failure can occur because of infiltration of metal into the joints, and the problem can be worsened when graphitised cathode blocks are used, which have a very low sodium swelling index. Because of this problem, there is a need for a high swelling, cold ramming paste which can serve to tighten the peripheral joint (big joint) and joints between the cathode blocks.

Another problem that can occur with these electrolytic cells is, because of occasional excessive metal motion due to magneto-hydrodynamic effects (MHE), the cathode lining and, particularly the amount of monolithic side slope and the joints between the cathode blocks, can be subjected to rapid erosion and failure.

Reamey et al. U.S. Pat. No. 3,871,986 describes a ramming cement for an aluminum reduction cell which is described as not shrinking when subsequently baked. That required a special pitch binder comprising a petroleum pitch having a cube-in-water softening point between about 40° and about 85° C. and having a content of material insoluble in quinoline not greater than about 1%.

U.S. Pat. No. 5,961,811 (Keller) describes another form of ramming paste for an aluminum reduction cell made of carbon and a reactive compound, such as a carbide, fluoride, phosphate or oxide compound, capable of reacting with titanium or zirconium to produce titanium or zirconium diboride during operation of the cell to produce aluminum. The titanium or zirconium diboride is produced in an amount sufficient to improve molten aluminum wetting properties of the carbonaceous material.

In Mirtchi, U.S. Pat. No. 6,258,224, the problem had to do with the erosion/corrosion of bottom blocks of an electrolytic cell for producing aluminum because of the movement of cell contents caused by MHE. That patent provided a multi-layer cathode structure including a carbonaceous cathode substrate and at least one layer of a metal boride, e.g. $TiB_2$, containing composite refractory material over the substrate. The inner face between the substrate and the $TiB_2$ composite material was first roughened (raked) to overcome thermal expansion differences between the two materials.

Another attempt at improving ramming paste for aluminum reduction cells is described in de Nora et al. U.S. Pat. No. 5,676,807. The main concern in de Nora was the polluting affect of pitch binders and, according to that invention, the ramming paste was produced using a colloidal binding material, e.g. alumina in colloidal form.

It is an object of the present invention to provide an improved ramming paste that has a high swelling index and can be used under cold, e.g. 30° C., conditions.

It is a further object of this invention to provide an improved ramming paste having good erosion resistance and which is wettable by aluminum.

SUMMARY OF THE INVENTION

In accordance with the present invention there is provided a novel high swelling cold ramming paste for aluminum electrolysis cells which is readily prepared from commercially available materials. The paste can be used for the monolithic side slopes and in the joints between the cathode blocks.

It has been discovered that a cold ramming paste typically containing anthracite as aggregate and pitch as a binder, can be provided with a high swelling property by adding thereto a portion of crushed anode butts or calcined coke. The anode butts are the remains of consumed anodes removed from the electrolytic cell and the calcined coke is typically calcined petroleum coke of the type used in the manufacture of the anodes.

Thus, according to one main feature of this invention there is provided a high swelling cold ramming paste which comprises a blend of pitch, light oil diluent and an aggregate comprising a mixture of anthracite and crushed anode butts or calcined coke. The crushed anode butts or calcined coke typically comprise up to 20% by weight of the total aggregate, preferably about 15 to 20% by weight of the total aggregate. The pitch is typically present in an amount of about 10 to 15% by weight and a light oil in an amount of up to 10% by weight, e.g. about 5 to 10% by weight, with the balance being the aggregate.

The light oil acts as a solvent for the pitch, lowering its softening point and therefore makes the ramming paste soft and sticky at room temperature. The light oil is typically a light carbolic oil residue boiling in the range of about 210–355° C.

According to a further feature of this invention, the above ramming paste may be provided with erosion resistance as well as wettability by adding thereto a portion of a refractory hard material, e.g. a crushed refractory material, $TiB_2$, $TiO_2$, $B_2O_3$, SiC, $Al_2O_3$, etc. These materials can provide both wettability and reinforcement to the paste. For the ramming paste containing a boride such as titanium diboride, a typical composition comprises 30 to 60% by weight titanium diboride, 10 to 15% by weight pitch, 5 to 10% by weight light oil and the balance aggregate, this aggregate being a mixture of anthracite and crushed anode butts or calcined coke with the crushed butts or calcined coke being present in an amount of up to 20% by weight of the total aggregate. This ramming paste is referred to hereinafter as "$TiB_2$-containing paste".

The components are preferably mixed together to form the paste at a mixing temperature of about 90 to 130° C. for a mixing time of about 20 to 50 minutes. The paste is preferably applied to the joints between the cathode blocks and to the monolithic slope between the blocks and the side wall of the cell at a temperature in the range of about 20 to 40° C.

The ramming paste is preferably applied to the joints as a series of layers, with tamping being carried out between layers to form a tight, non-porous joint. The top layer is preferably formed of the $TiB_2$-containing paste. When the top layer is applied, the layer of ramming paste immediately below is not separately tamped and the two layers are tamped together. This causes intermingling between the layers to allow for thermal expansion differences between the layers. The $TiB_2$-containing top layer typically has a thickness of about 2.5 to 12.5 cm, preferably about 3.75 to 7.5 cm.

The $TiB_2$-containing ramming paste typically has a higher density than standard ramming paste in both loose and compacted form. In loose form the $TiB_2$-containing paste typically has a density at least 25% greater than that of regular commercial ramming paste, while in compacted form it has a density typically at least 30% greater.

It is believed that the high swelling property of the ramming paste of this invention can be found in the disorganized structure of coke in the crushed anode butts or calcined coke which constitutes a more favourable site for sodium penetration and thus sodium swelling. Because of the sodium swelling, a high swelling paste is obtained which can tightened the peripheral joint (big joint) and the joints between the blocks, and, therefore, prevent the infiltration of metal and bath. It has been found that when crushed anode butts or calcined coke form part of the aggregate in an amount in the range of 15 to 20% by weight of the total aggregate, the sodium swelling index of the paste is about four times higher than that of regular ramming pastes.

DESCRIPTION OF THE PREFERRED EMBODIMENTS

Example 1

Figure 1:
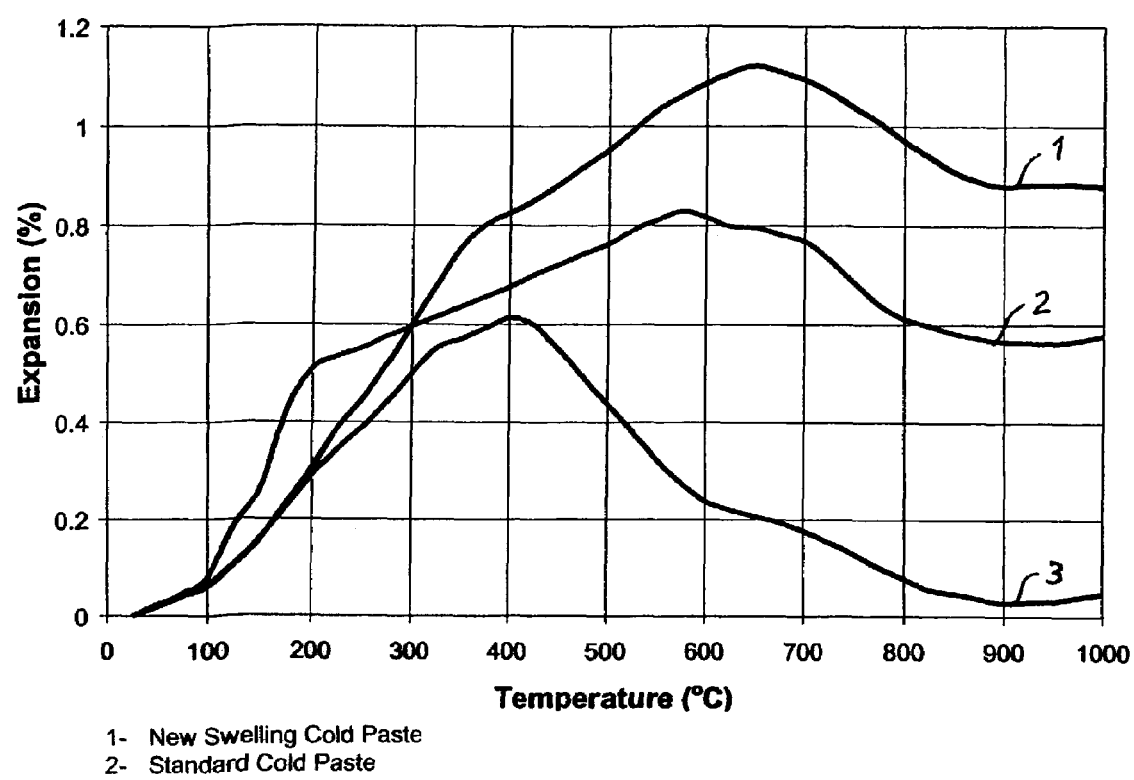
FIG. 1 is plots of expansion as a function of temperature for three different ramming pastes.

A swelling cold ramming paste was prepared containing 10% by weight of pitch, 6.3% by weight of a light carbolic oil residue and 83.7% by weight of aggregate. The aggregate contained 83% by weight anthracite and 17% by weight of crushed anode butts.

For a comparative study, a traditional cold ramming paste was prepared containing 10% by weight pitch, 6.3% by weight light carbolic oil residue boiling in the range of about 210–355° C. and the balance anthracite aggregate. The properties of these two ramming pastes were compared to each other and also with the commercial ramming pastes, namely Carbone Savoie AMT73S30 and the Vesuvius CP45.

The properties are shown in Table 1 below. It can be seen that the sodium swelling index of the swelling ramming paste of the invention is about four times higher than that of the conventional anthracite-based paste.

TABLE 1

| | Ramming Paste Properties | | | |
|---|---|---|---|---|
| | New Swelling Cold Ramming Paste | Std. Cold Ramming Paste | Carbone Savoie AMT73S30 | Vesuvius CP45 |
| Baked Density (g/cm³) | 1.456 ± 0.005 (n = 8) | 1.482 ± 0.007 (n = 12) | 1.466 ± 0.006 (n = 4) | 1.542 ± 0.004 (n = 8) |
| Electrical Resistivity (μΩ · m) | 60 ± 1 (n = 8) | 60 ± 1 (n = 12) | 66 ± 1 (n = 4) | 58 ± 1 (n = 4) |
| Crushing Strength (MPa) | 18.3 ± 0.2 (n = 8) | 16.5 ± 2.8 (n = 12) | 18 ± 1 (n = 4) | 27 ± 1 (n = 4) |
| Tensile Strength (MPa) | 1.9 ± 0.2 (n = 8) | 1.9 ± 0.2 (n = 12) | 2.2 ± 0.4 (n = 4) | 3.8 ± 0.3 (n = 4) |
| Thermal Expansion Coefficient (×10⁻⁶/° C.) | 4.48 ± 0.05 (n = 8) | 4.28 ± 0.08 (n = 12) | na | 4.14 ± 0.12 (n = 4) |
| Thermal Conductivity at Room Temperature (W/m ° C.) | 5.51 ± 0.33 (n = 8) | 5.58 ± 0.47 (n = 12) | na | 6.39 ± 0.14 (n = 4) |
| Shrinkage** (%) | 0.23 ± 0.08 (n = 3) | 0.27 ± 0.07 (n = 3) | 0.10 ± 0.06 (n = 2) | 0.58 |

TABLE 1-continued

Ramming Paste Properties

|  | New Swelling Cold Ramming Paste | Std. Cold Ramming Paste | Carbone Savoie AMT73S30 | Vesuvius CP45 |
|---|---|---|---|---|
| Sodium Swelling Index (%) | 4.9 ± 1 (n = 4) | 1.1 ± 0.1 (n = 6) | 0.84 ± 0.09 (n = 2) | 1.2 |
| Tamping Density (g/cm$^3$) | 1.611 ± 0.014 (n = 15) | 1.657 ± 0.016 (n = 16) | 1.622 ± 0.003 (n = 4) | 1.644 ± 0.006 (n = 4) |

The results expressed as the average ± the standard deviation
n: number of test
na: not available Example 2

Another very important property of ramming paste is its degree of shrinkage. The ramming paste of this invention has a shrinkage of less than that of Vesuvious CP-45 paste. Typical expansion/shrinkage curves of the swelling cold paste of this invention, regular Alcan cold paste and Vesuvius CP45 paste are shown in FIG. 1.

Example 3

A further ramming paste was prepared containing titanium diboride. This paste was prepared by mixing together 7% by weight light oil, 12% by weight pitch, 55% by weight titanium diboride powder and 26% by weight of aggregate consisting of a mixture of anthracite and crushed anode butts, with the crushed anode butts being present in an amount of about 17% by weight of the total aggregate. These ingredients were mixed together at a mixing temperature of about 100 to 120° C. for a mixing time of about 45 minutes. A ramming paste was obtained which could be used in an operational temperature of about 25 to 35° C.

This greatly increased the erosion resistance of the ramming paste as well as providing it with wettability with respect to aluminum.

Example 4

Tests were conducted to compare the density of the TiB$_2$ paste of Example 3 with a conventional ramming paste (Vesuvious CP-45). Density tests were conducted on both loose material and compacted material.

For the tests, a tube was used having a diameter of 5.22/cm, a height of 21.92 cm and a volume of 469.29 cc. For the loose material, the tube was filled to the brim, with a couple of raps on a counter to cause some settling of the paste. In preparing the compacted sample, the material on the tube was impacted 200 with a tamping piston to cause compaction, after which the density was determined.

The results are shown in Table 2 below:

| DENSITY g/cc | | | |
|---|---|---|---|
| Vesuvious | | TiB$_2$ containing | |
| Free | Compacted | Free | Compacted |
| 0.847 | 1.655 | 1.092 | 2.194 |

The invention claimed is:

1. A high swelling cold ramming paste for use in joining components of electrolytic cells for the electrolysis of alumina for the production of aluminum, comprising a mixture of pitch, a light oil and a carbonaceous aggregate, said aggregate containing anthracite and crushed anode butts or calcined coke with the crushed anode butts or calcined coke comprising about 15 to 20% by weight of the total aggregate.

2. A high swelling cold ramming paste for use in joining components of electrolytic cells for the electrolysis of alumina for the production of aluminum, comprising a mixture of 10 to 15% by weight of pitch, 5 to 10% by weight of light oil having a boiling point in the range of about 210–355° C., and a carbonaceous aggregate, said aggregate comprising anthracite and crushed anode butts where the crushed anode butts comprise about 15 to 20% by weight of the total carbonaceous aggregate, and which further comprises about 30 to 60% by weight titanium diboride.

3. A method of making a high swelling cold ramming paste for use in joining components of electrolytic cells for the electrolysis of alumina for the production of aluminum which comprises mixing together about 10 to 15% by weight pitch, about 5 to 10% by weight light oil and a carbonaceous aggregate comprising anthracite and crushed anode butts or calcined coke with the crushed anode butts or calcined coke comprising about 15 to 20% by weight of the total aggregate, said mixing being carried out at about 90 to 130° C. for about 20 to 50 minutes.

* * * * *